United States Patent
Watanabe et al.

(10) Patent No.: US 8,256,386 B2
(45) Date of Patent: Sep. 4, 2012

(54) SADDLE-RIDE VEHICLE

(75) Inventors: Kenji Watanabe, Saitama (JP);
Yoshinobu Ozaki, Saitama (JP); Bruno Conte, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 252 days.

(21) Appl. No.: 12/393,780

(22) Filed: Feb. 26, 2009

(65) Prior Publication Data
US 2010/0170456 A1 Jul. 8, 2010

Related U.S. Application Data

(60) Provisional application No. 61/143,295, filed on Jan. 8, 2009.

(51) Int. Cl.
*F01P 9/00* (2006.01)
(52) U.S. Cl. .................. 123/41.01; 123/41.86; 123/698; 123/196 CP; 123/41.7
(58) Field of Classification Search ............... 123/41.86, 123/698, 196 CP, 41.74, 41.01
See application file for complete search history.

(56) References Cited

U.S. PATENT DOCUMENTS

| | | | | |
|---|---|---|---|---|
| 4,237,996 A | * | 12/1980 | Matsuda et al. | 180/229 |
| 4,685,530 A | * | 8/1987 | Hara | 180/219 |
| D295,029 S | * | 4/1988 | Kizawa et al. | D12/110 |
| 4,830,135 A | * | 5/1989 | Yamashita | 180/229 |
| 5,036,803 A | * | 8/1991 | Nolting et al. | 123/41.1 |
| 5,934,234 A | * | 8/1999 | Shichinohe et al. | 123/90.31 |
| 6,245,451 B1 | * | 6/2001 | Kamisawa et al. | 428/697 |
| 6,425,451 B2 | * | 7/2002 | Yoshida et al. | 180/219 |
| 6,729,294 B2 | * | 5/2004 | Okano et al. | 123/198 E |
| D498,179 S | * | 11/2004 | James | D12/110 |
| 7,124,715 B2 | * | 10/2006 | Hutchins | 123/41.1 |
| 7,178,498 B2 | * | 2/2007 | Takeuchi | 123/196 R |
| 7,337,755 B2 | * | 3/2008 | Gokan et al. | 123/41.01 |
| D582,319 S | * | 12/2008 | Miwa et al. | D12/110 |
| 2003/0062018 A1 | * | 4/2003 | Okano et al. | 123/198 E |
| 2003/0094147 A1 | * | 5/2003 | Hoelle et al. | 123/41.44 |
| 2005/0263110 A1 | * | 12/2005 | Yasui | 123/41.72 |
| 2007/0044757 A1 | * | 3/2007 | Suzuki | 123/339.23 |

FOREIGN PATENT DOCUMENTS

JP 2004-211644 * 7/2004

* cited by examiner

*Primary Examiner* — Noah Kamen
*Assistant Examiner* — Long T Tran
(74) *Attorney, Agent, or Firm* — Birch, Stewart, Kolasch & Birch, LLP

(57) ABSTRACT

A saddle-ride vehicle includes an engine with a front cylinder extended forward and diagonally upward from a crankcase. The engine is mounted between a front wheel and a rear wheel. A space gradually vertically extended forward is provided between a fuel tank arranged on the upside of the front cylinder and a front head cover provided to an upper part of the front cylinder. A radiator upstream water passage extended backward from an upper part of a radiator is provided in front of the front cylinder and is arranged in the space. The radiator upstream water passage is covered with a front overhead cover attached to the front cylinder. With this configuration, vehicle body components are not exposed, thereby protecting the vehicle body components. In addition, the appearance of the vehicle is efficiently enhanced.

16 Claims, 6 Drawing Sheets

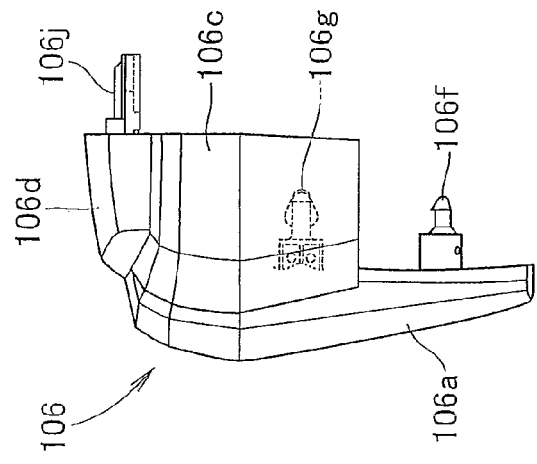
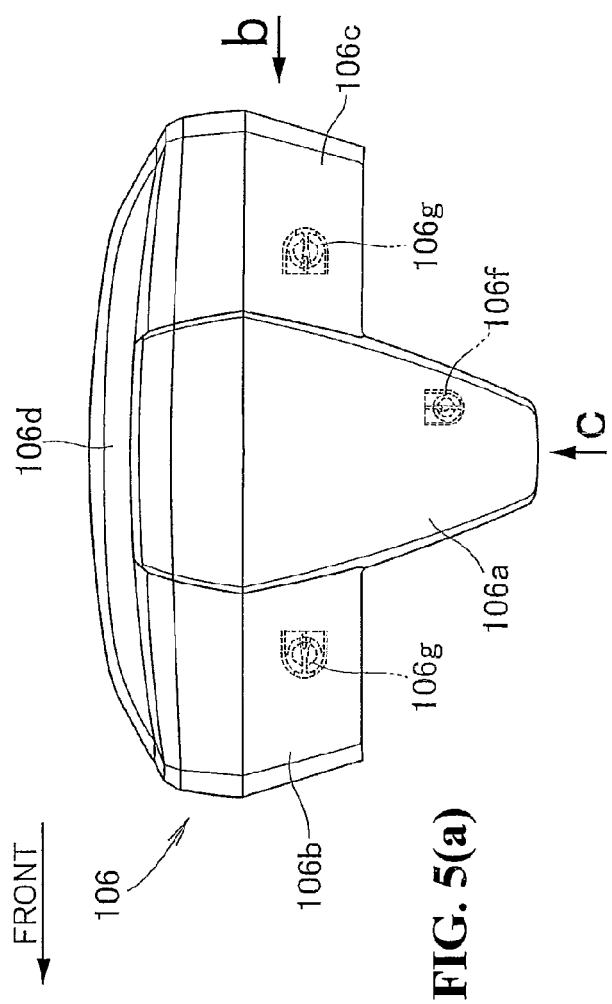
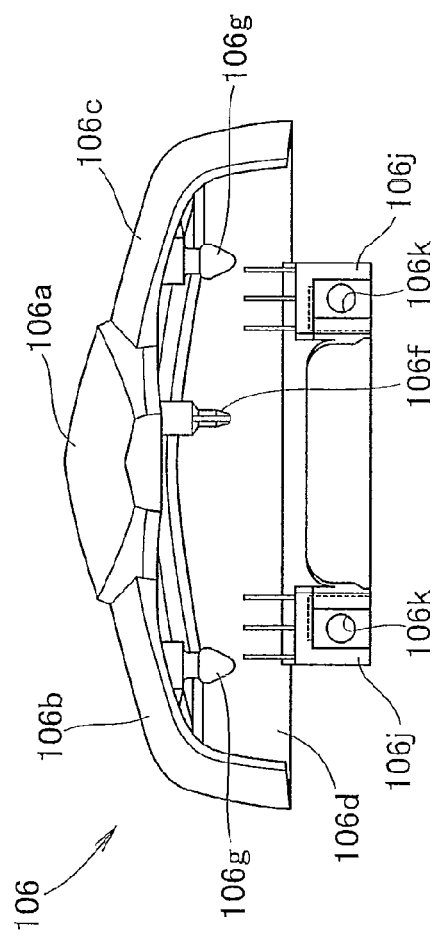
FIG. 5(a)
FIG. 5(b)
FIG. 5(c)

SADDLE-RIDE VEHICLE

CROSS-REFERENCE TO RELATED APPLICATION

The present application claims priority under 35 U.S.C. §120 to U.S. Provisional Application No. 61/143,295, filed Jan. 8, 2009, the entire contents of which are hereby incorporated by reference.

BACKGROUND OF THE INVENTION

1. Field of the Invention

The present invention relates to the improvement of a saddle-ride vehicle.

2. Description of Background Art

For a conventional type of saddle-ride vehicle, a motorcycle in which a V-type engine is mounted is known (for example, refer to JP-A No. 2003-83161).

As shown in FIGS. 1 and 2 in JP-A No. 2003-83161, the V-type engine E is attached to a lower part of a body frame 21 and a relatively large space enclosed by a first bank BA which is a front cylinder and which is extended forward and diagonally upward from a crankcase 31 of the engine E, the front of the body frame 21 and a fuel tank 27 attached to an upper part of the body frame 21 is formed.

As a top face of the first bank BA in JP-A No. 2003-83161 is directed forward and diagonally upward, the top face of the first bank BA is easily in sight from the front side of the body via the space, therefore, the appearance quality is required to be considered, and it is desirable that the appearance quality is enhanced, compared with a vehicle where a top face of a cylinder of an engine is mostly out of sight from the front side of a vehicle body for example.

SUMMARY AND OBJECTS OF THE INVENTION

An object of the present invention is to provide a saddle-ride vehicle where vehicle body components are not exposed and the appearance quality can be efficiently enhanced, protecting them.

According to an embodiment of the present invention, a saddle-ride vehicle where an engine provided with a front cylinder extended forward and diagonally upward from a crankcase is mounted between a front wheel and a rear wheel, and has a characteristic that a space gradually vertically extended forward is provided between a fuel tank arranged on the upside of the front cylinder and a head cover provided at an upper end of the front cylinder, a front water passage extended backward from an upper part of a radiator provided in front of the front cylinder is arranged in the space and the front water passage is covered with an overhead cover attached to the front cylinder.

For the action, even if the space is provided between the fuel tank and the head cover, the front water passage is covered with the overhead cover and is not exposed outside.

According to an embodiment of the present invention, the overhead cover is formed by a left cover and a right cover that respectively cover the left and the right of an upper part of the head cover and a central cover that covers a top face of the head cover between the left cover and the right cover and an outside face of the central cover is formed to be a smooth face.

For the action, when the overhead cover is attached to the front cylinder, the left cover, the right cover and the central cover are separately attached.

Various pipes are attached to the top face of the head cover and irregularities are formed according to the contour of a cylinder head, however, the various pipes on the top face of the head cover and the irregularities of a cylinder head are prevented from being exposed outside by covering the upside of the head cover with the central cover formed so that its upper end is smooth.

According to an embodiment of the present invention, the engine is provided with a rear cylinder extended backward and diagonally upward from the crankcase, a central water passage that couples water jackets respectively provided to the front cylinder and the rear cylinder is formed between the front cylinder and the rear cylinder and a thermostat is arranged in the central water passage.

For the action, a case housing the thermostat is arranged in the central water passage arranged between the front cylinder and the rear cylinder and a space between the front cylinder and the rear cylinder is effectively utilized.

According to an embodiment of the present invention, an opening for passing the front water passage is formed in the front of the central cover.

For the action, when the whole front of the central cover is open and the front water passage is arranged for example, the inside is easily in sight from an open part of the front of the central cover, however, the inside of the central cover is hardly exposed by forming the opening for passing the front water passage in the front of the central cover.

When the opening is machined in the central cover, the machining is facilitated, compared with a case that the left cover, the right cover and the central cover are integrated.

According to an embodiment of the present invention, respective one ends of a breather pipe for taking outside air so as to ventilate the inside of the engine and/or a secondary air passage for taking secondary air in an exhaust passage are connected to the head cover, the respective other ends are extended at the back of the front cylinder and the breather pipe and/or the secondary air passage are covered with the overhead cover.

For the action, the breather pipe and/or the secondary air passage are covered with the overhead cover and therefore, are not exposed outside.

Effects of the invention include the following:

According to an embodiment of the present invention, as the space gradually vertically extended forward is provided between the fuel tank arranged on the upside of the front cylinder and the head cover provided at the upper end of the front cylinder, the front water passage extended backward from the upper part of the radiator provided in front of the front cylinder is arranged in the space and the front water passage is covered with the overhead cover attached to the front cylinder, the appearance quality can be enhanced, effectively protecting the front water passage because the front water passage is covered with the overhead cover and is out of sight even in the American type of motorcycle where the large space exists between the fuel tank and the head cover.

According to an embodiment of the present invention, as the overhead cover is formed by the left cover and the right cover that respectively cover the left and the right of the upper part of the head cover and the central cover that covers the top face of the head cover between the left cover and the right cover and the outside face of the central cover is formed to be a smooth face, the overhead cover has structure divided into the left cover, the right cover and the central cover and therefore, the assembly workability can be enhanced. As the top face of the central cover is formed to be a smooth face, the appearance quality of the engine can be enhanced.

According to an embodiment of the present invention, as the engine is provided with the rear cylinder extended backward and diagonally upward from the crankcase, the central water passage that couples the water jackets respectively provided to the front cylinder and the rear cylinder is formed between the front cylinder and the rear cylinder and the thermostat is arranged in the central water passage, the relatively large thermostat case housing the thermostat can be effectively arranged, utilizing the space between the front cylinder and the rear cylinder and a degree of freedom of arranging an another body space can be enhanced.

According to an embodiment of the present invention, as the opening for passing the front water passage is formed in the front of the central cover, the inside of the central cover is hardly exposed and the appearance quality can be enhanced. Also, as the opening is provided to the divided central cover, the machining of the opening can be facilitated.

According to an embodiment of the present invention, as the respective one ends of the breather pipe for taking outside air so as to ventilate the inside of the engine and/or the secondary air passage for taking secondary air in the exhaust passage are connected to the head cover, the respective other ends are extended at the back of the front cylinder and the breather pipe and/or the secondary air passage are covered with the overhead cover in addition to the front water passage, the appearance quality can be further enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5(a), 5(b) and 5(c) are first explanatory drawings showing a front overhead cover according to the present invention.

DETAILED DESCRIPTION OF THE PREFERRED EMBODIMENTS

Figure 1:
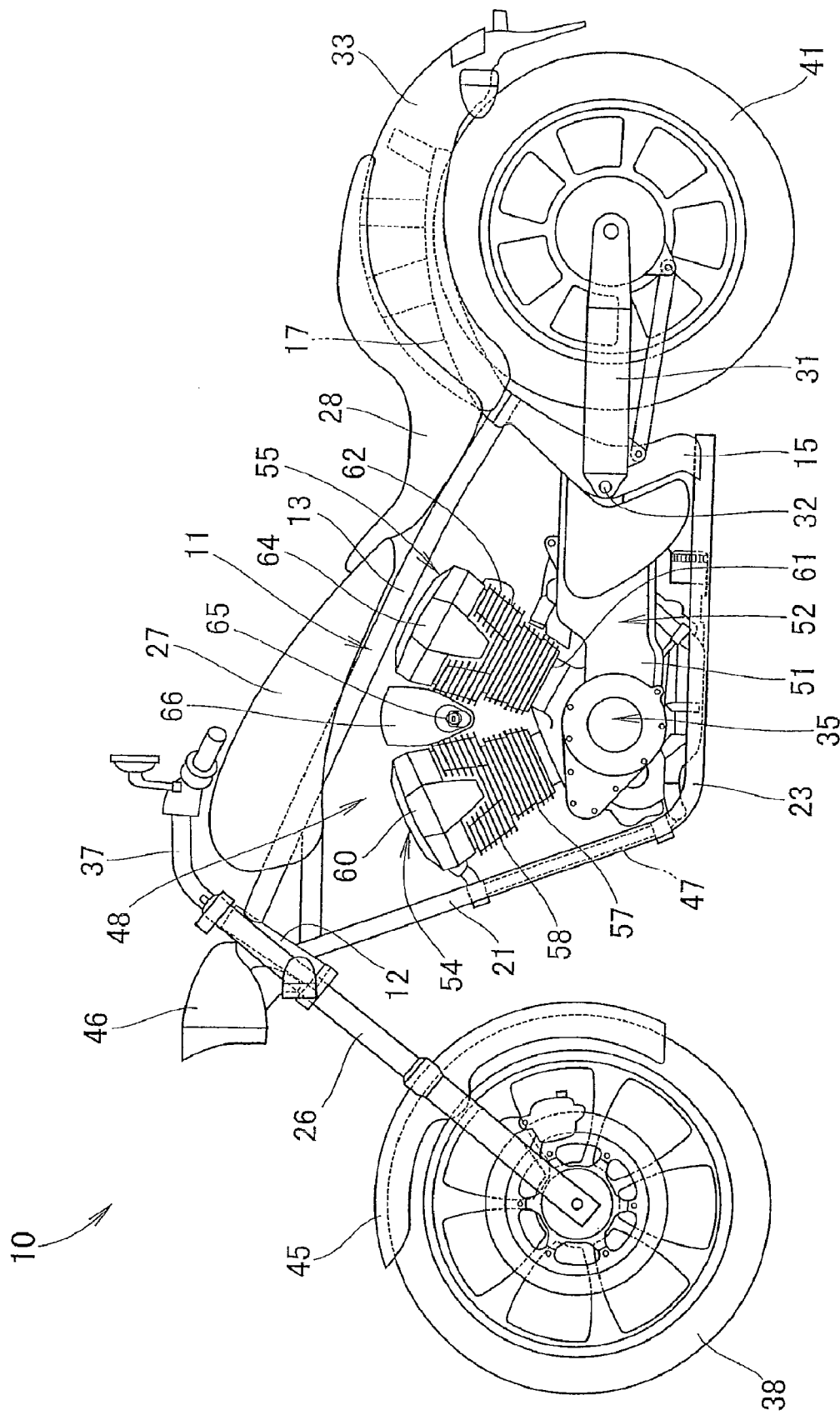
FIG. 1 is a side view showing a saddle-ride vehicle according to the present invention.

FIG. 1 is a side view showing a saddle-ride vehicle according to the invention. A saddle-ride vehicle 10 is an American type of motorcycle including a body frame 11 configured by a head pipe 12 provided to a front end of the body frame, a main frame 13 extended backward and diagonally downward from the head pipe 12, a pair of right and left pivot frames 15, 16 (only the reference numeral 15 on this side is shown) attached to a rear end of the main frame 13, a pair of right and left rear frames 17, 18 (only the reference numeral 17 on this side is shown), a pair of right and left down frames 21, 22 (only the reference numeral 21 on this side is shown) extended backward and diagonally downward on the downside of the main frame 13 from the head pipe 12 and a pair of right and left lower frames 23, 24 (only the reference numeral 23 on this side is shown) extended backward from lower ends of the down frames 21, 22 with them integrated with the lower ends and connected to lower ends of the pivot frames 15, 16.

To further describe the body frame, a front fork 26 is steerably attached to the head pipe 12, a fuel tank 27 and a seat 28 are attached on the upside of the main frame 13, a swing arm 31 is swingably attached to the pivot frames 15, 16 via a pivot 32, a rear fender 33 is attached to the rear frames 17, 18, a V-type engine 35 is attached to the down frames 21, 22 and the lower frames 23, 24, a handlebar 37 is attached at an upper end of the front fork 26, a front wheel 38 is attached at its lower end, and a rear wheel 41 is attached at a rear end of the swing arm 31.

Also shown are a front fender 45 that covers the upside of the front wheel 38, a headlamp 46 attached to the front fork 26, a radiator 47 attached to the down frames 21, 22 in front of the engine 35 so as to cool the engine 35, and a space 48 provided between the fuel tank 27 and a front head cover (not shown) provided at an upper end of a front cylinder 54 described later of the engine 35 so that the space is gradually vertically extended in front.

The engine 35 is a power unit provided with a transmission 52 at the back of a crankcase 51 with the transmission integrated with the crankcase and is provided with the front cylinder 54 extended forward and diagonally upward from the crankcase 51 and a rear cylinder 55 extended backward and diagonally upward from the crankcase 51.

The front cylinder 54 is provided with a front cylinder block 57 attached to the upper front of the crankcase 51, a front cylinder head 58 attached to the upside of the front cylinder block 57, the front head cover (not shown) that covers the upside of the front cylinder head 58 and a front overhead cover 60 that covers the circumference of the front head cover.

The rear cylinder 55 is provided with a rear cylinder block 61 attached to the upper rear of the crankcase 51, a rear cylinder head 62 attached to the upside of the rear cylinder block 61, a rear head cover (not shown) that covers the upside of the rear cylinder head 62 and a rear overhead cover 64 that covers the circumference of the rear head cover.

An intake manifold (not shown) that supplies air to the inside of the front cylinder head 58 and to the inside of the rear cylinder head 62 is arranged between the front cylinder head 58 and the rear cylinder head 62, and a main switch 65 provided with at least a function of an ignition switch is attached to the intake manifold. Also shown are a switch cover 66 that covers the circumference of the main switch 65.

Figure 2:
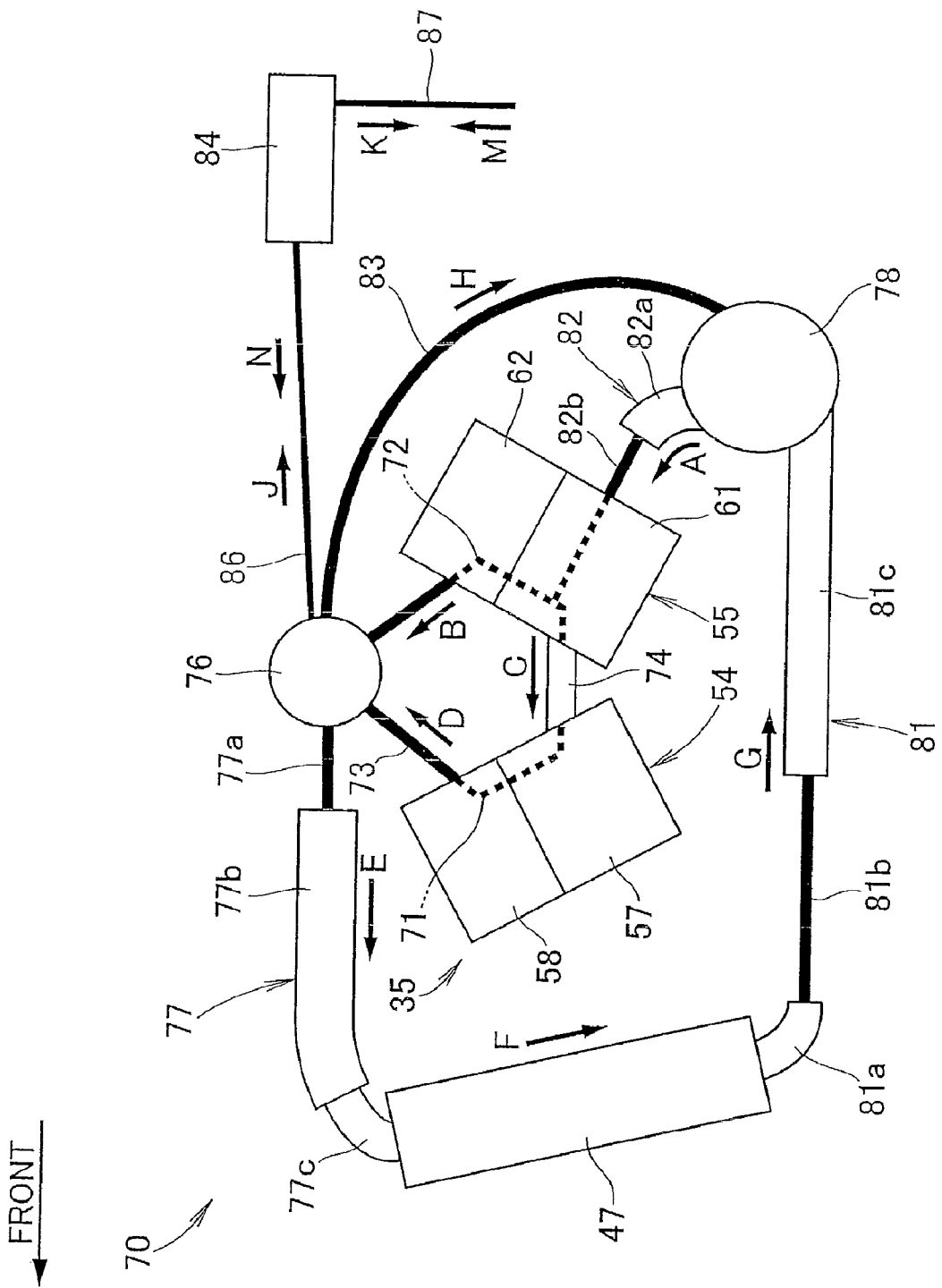
FIG. 2 is a system diagram showing a cooling water path of an engine according to the present invention.

FIG. 2 is a system diagram showing a cooling water path of the engine according to the invention.

The cooling water path 70 includes a front water jacket 71 provided in the front cylinder 54 (detailedly, the front cylinder block 57 and the front cylinder head 58) of the engine 35, a rear water jacket 72 provided in the rear cylinder 55 (detailedly, the rear cylinder block 61 and the rear cylinder head 62), an upper water passage 73 and a lower water passage 74 respectively coupling the front water jacket 71 and the rear water jacket 72, a radiator upstream water passage 77 leading from a thermostat case 76 provided on the way of the upper water passage 73 so as to house a thermostat to an upper part of the radiator 47, a water passage in the radiator 47, and a radiator downstream water passage 81 leading from the radiator 47 to a water pump 78 provided to the crankcase 51 (see FIG. 1).

In addition, the cooling water path 70 includes a water passage in the water pump 78, a return water passage 82 leading from the water pump 78 to the rear water jacket 72, a bypass water passage 83 leading from the thermostat case 76 to the water pump 78, and a reserve tank water passage 86 leading from the thermostat case 76 to a reserve tank 84 for storing cooling water. An atmosphere release passage 87 for releasing pressure in the reserve tank 84 into the atmosphere is connected to the reserve tank 84.

A part shown by a black thick line in FIG. 2 of each water passage denotes a rubber hose and a part shown by a white frame denotes a metallic pipe.

That is, the upper water passage 73, the bypass water passage 83, the reserve tank water passage 86 and the atmosphere release passage 87 are made of rubber hose. The lower water passage 74 is made of a metallic pipe.

The radiator upstream water passage 77 is configured by a rubber hose 77a one end of which is connected to the thermostat case 76, a metallic first pipe 77b one end of which is connected to the other end of the rubber hose 77a and a metallic radiator upside pipe 77c one end of which is attached to an upper part of the radiator 47 and the other end of which is connected to the other end of the first pipe 77b.

The radiator downstream water passage 81 is configured by a metallic radiator downside pipe 81a one end of which is attached to a lower part of the radiator 47, a rubber hose 81b one end of which is connected to the other end of the radiator downside pipe 81a and a metallic second pipe 81c integrated with the water pump 78 and connected to the other end of the rubber hose 81b.

The return water passage 82 is configured by a metallic third pipe 82a integrated with the water pump 78 and a rubber hose 82b one end of which is connected to the third pipe 82a, the other end of which is connected to the rear cylinder 55 and which communicates with the rear water jacket 72.

Next, the circulation of cooling water in the cooling water path 70 will be described in order.

When the water pump 78 is operated, cooling water in the water pump 78 reaches the rear water jacket 72 in the rear cylinder 55 through the return water passage 82 as shown by an arrow A and cools the inside of the rear cylinder 55.

The cooling water in the rear water jacket 72 reaches the thermostat case 76 through the upper water passage 73 as shown by an arrow B, reaches the front water jacket 71 in the front cylinder 54 through the lower water passage 74 as shown by an arrow C, and cools the inside of the front cylinder 54.

The cooling water in the front water jacket 71 reaches the thermostat case 76 through the upper water passage 73 as shown by an arrow D.

When the temperature of the cooling water is higher than predetermined temperature in the thermostat case 76, the thermostat is opened, the cooling water in the thermostat case 76 reaches the radiator 47 through the radiator upstream water passage 77 as shown by an arrow E, and heat is radiated from the cooling water while the cooling water flows downward in the water passage in the radiator 47 as shown by an arrow F.

The cooling water in the radiator 47 flows into the water pump 78 through the radiator downstream water passage 81 as shown by an arrow G and further, returns to the rear water jacket 72 in the rear cylinder 55 through the return water passage 82 as shown by the arrow A. Afterward, as described above, the cooling water is circulated in the cooling water path 70.

As the thermostat is closed when the temperature of the cooling water in the thermostat case 76 is lower than the predetermined temperature, the cooling water in the thermostat case 76 does not flow to the side of the radiator 47 but is returned to the water pump 78 through the bypass water passage 83 as shown by an arrow H, and the cooling water is circulated in the path.

When the temperature of the cooling water in the cooling water path 70 rises and pressure in the cooling water path 70 exceeds a predetermined value, a valve (not shown) provided to the thermostat case 76 is opened and the pressure in the cooling water path 70 is released into the atmosphere via the reserve tank water passage 86, the reserve tank 84 and the atmosphere release passage 87 as shown by arrows J and K. Hereby, the swollen cooling water in the cooling water path 70 reaches the reserve tank 84 through the reserve tank water passage 86 as shown by the arrow J.

As pressure in the cooling water path 70 decreases and the cooling water is contracted when the temperature of the cooling water in the cooling water path 70 falls, the valve provided to the thermostat case 76 is opened, air is taken in the cooling water path 70 via the atmosphere release passage 87, the reserve tank 84 and the reserve tank water passage 86 as shown by arrows M and N, and the cooling water in the reserve tank 84 is returned to the thermostat case 76 through the reserve tank water passage 86 as shown by the arrow N.

Figure 3:
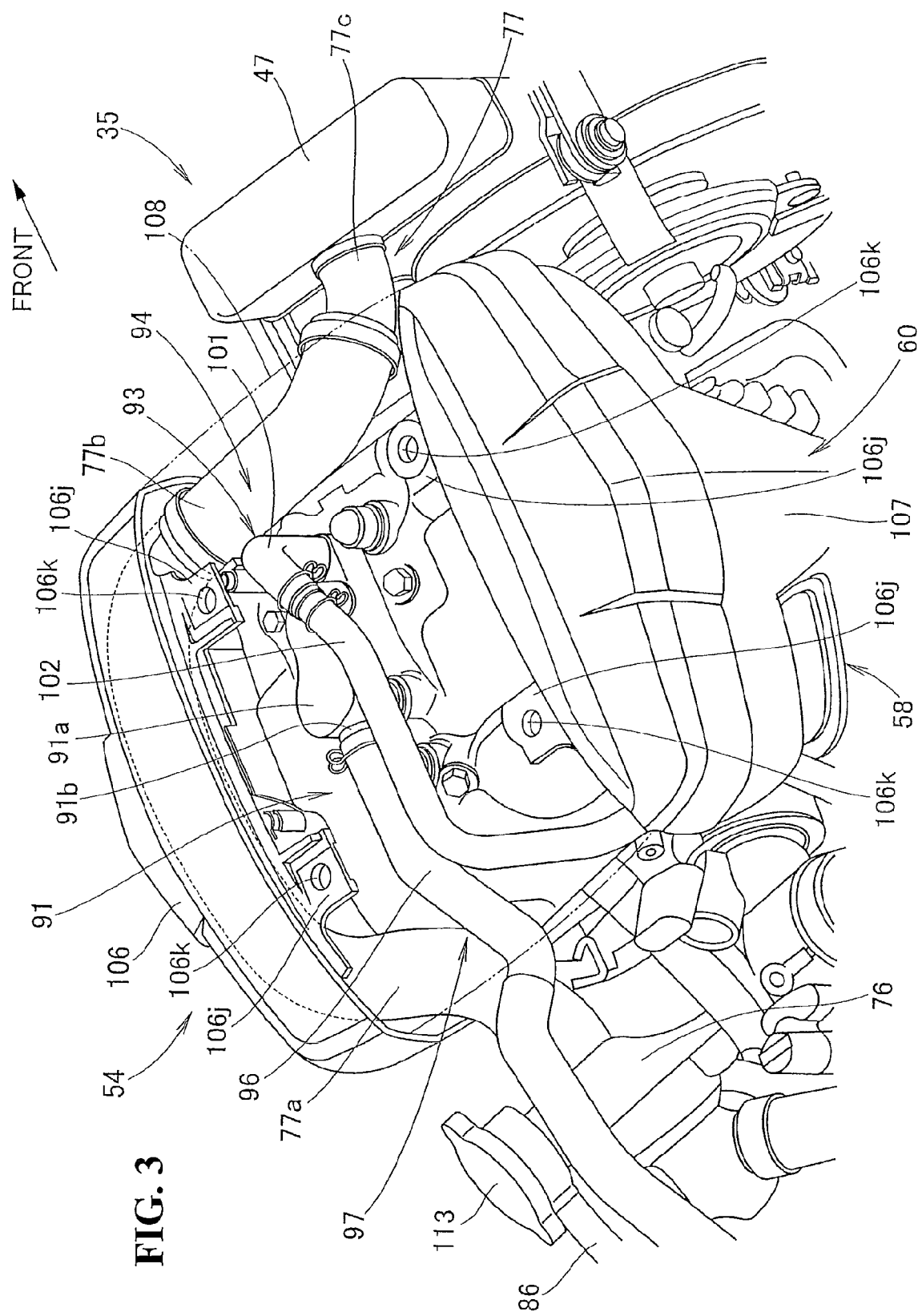
FIG. 3 is a perspective view showing a main part of a front cylinder of the engine according to the present invention.

FIG. 3 is a perspective view showing a main part of the front cylinder of the engine according to the invention. The front head cover 91 is attached to an upper part of the front cylinder head 58 so as to cover the upside of the front cylinder head 58 in the front cylinder 54, and a crankcase emission control system 94 that returns blowby gas in the engine 35, detailedly, in a valve train and the crankcase 51 (see FIG. 1) of the front cylinder head 58 to an intake system and burns the blowby gas in a combustion chamber, conducts air into the valve train and the crankcase 51 from the intake system via a breather passage 93 and ventilates, and a secondary air intake system 97 that conducts secondary air to an exhaust passage (an exhaust port, an exhaust manifold and others) from the intake system via a secondary air pipe 96 and burns unburnt gas in exhaust are connected to the front head cover 91.

The crankcase emission control system 94 is provided with the breather passage 93 for conducting air into the valve train and the crankcase 51, and the breather passage 93 is configured by an L-type pipe 101 attached to the front head cover 91 so as to communicate with the valve train and a breather pipe 102 one end of which is connected to the L-type pipe 101 and the other end of which is connected to the intake system (an air cleaner, an intake passage and others).

The secondary air intake system 97 is configured by the secondary air pipe 96 one end of which is connected to the air cleaner and the other end of which is connected to an intake port 91b provided to an uplifted part 91a of the front head cover 91, a reed valve (not shown) as a check valve provided in the uplifted part 91a, and a passage (not shown) in the head cover that communicates with the uplifted part 91a and the exhaust passage, and the secondary air intake system conducts secondary air to the exhaust passage utilizing the exhaust pulsation of exhaust pressure in the exhaust passage.

The rubber hose 77a and the first pipe 77b of the radiator upstream water passage 77 that connects the thermostat case 76 and the radiator 47 are arranged on the upside of the front head cover 91, and the rubber hose 77a, the first pipe 77b, the breather passage 93 and the secondary air pipe 96 are covered with the front overhead cover 60 that covers the upside and the side of the front head cover 91.

The front overhead cover 60 is configured by a left cover 106 and a right cover 107 that respectively cover both sides of the front head cover 91 and a central cover 108 that covers the upside and the front of the front head cover 91 between the left cover 106 and the right cover 107. In FIG. 3, only the contours of the front side and the rear side of the central cover 108 are shown.

Figure 4:
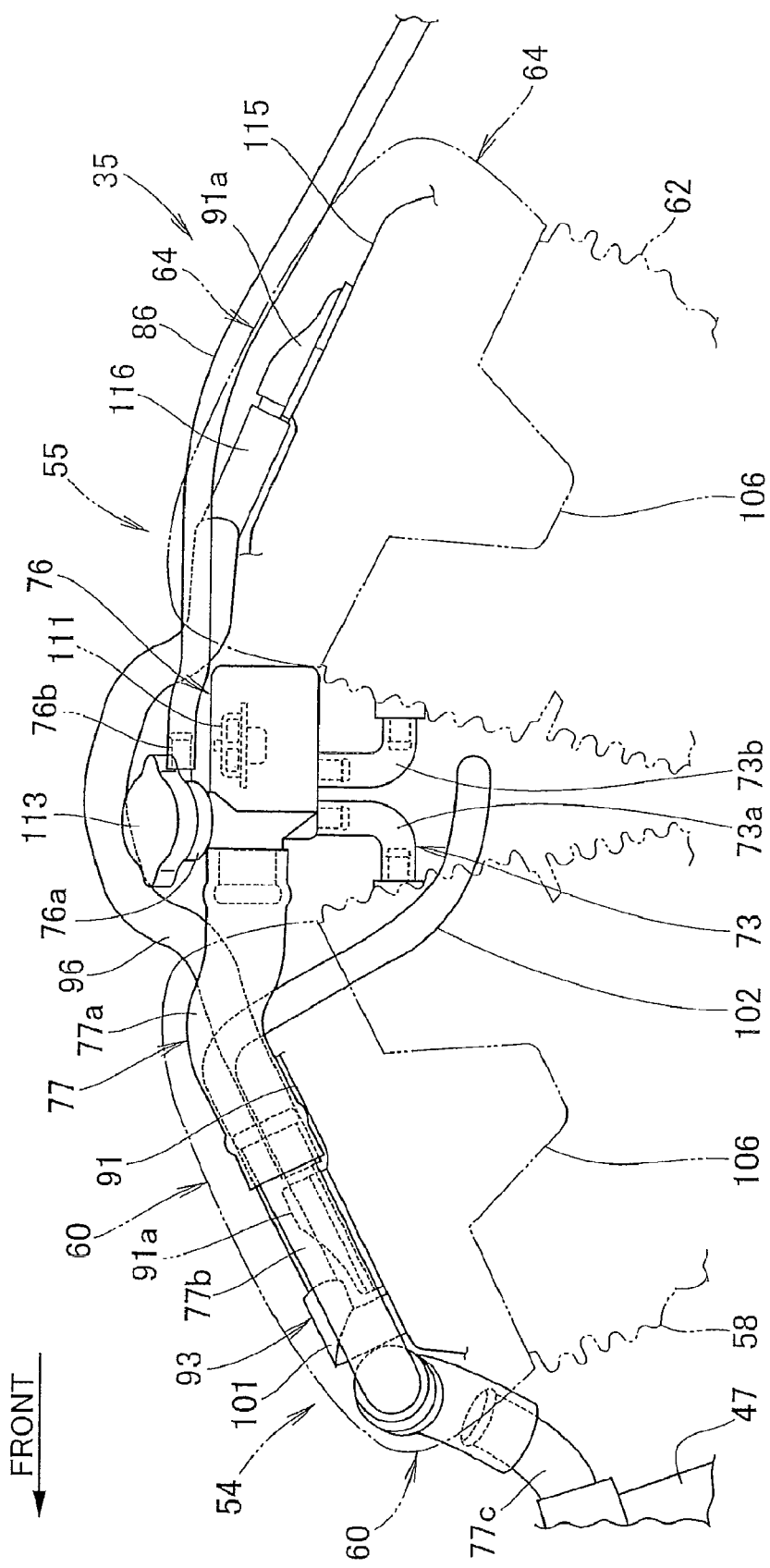
FIG. 4 is a side view showing a main part of an upper part of the engine according to the present invention.

FIG. 4 is a side view showing a main part of an upper part of the engine according to the invention. The upper water passage 73 is connected to the front cylinder 54 and the rear cylinder 55 of the V-type engine 35, detailedly, the front cylinder head 58 and the rear cylinder head 62, the thermostat case 76 housing the thermostat 111 is provided on the way of the upper water passage 73, and the radiator upstream water passage 77 is connected to the thermostat case 76 and the radiator 47. A rear connection port 76b protruded backward is provided to an injection hole 76a for injecting cooling water into the thermostat case 76, and the reserve tank water passage 86 is connected to the rear connection port 76b. A cap 113 closes the injection hole 76a.

The upper water passage 73 is provided with a first hose 73a that connects the front cylinder head 58 and the thermostat case 76 and a second hose 73b that connects the rear cylinder head 62 and the thermostat case 76.

The breather passage 93 and the secondary air pipe 96 are connected to an upper part of the front head cover 91, a secondary air pipe 116 is connected to a rear head cover 115 attached to the rear cylinder head 62 so as to close the upside of the rear cylinder head 62, the secondary air pipes 96, 116 are connected to each other, and another secondary air pipe (not shown) is extended on the side of the air cleaner from a connected part.

The upside and the side of the rear head cover 115 are covered with the rear overhead cover 64. The basic structure of the rear overhead cover 64 is the same as that of the front overhead cover 60 and only the front overhead cover 60 will be described below.

FIGS. 5(a) and 5(b) are first explanatory drawings showing the front overhead cover according to the invention and the left cover 106 will be described below. As the basic contour of the right cover 107 (see FIG. 3) is the same as that of the left cover 106, the description is omitted.

FIG. 5(a) is a side view showing the left cover 106. The left cover 106 is made of T-type resin in a side view, and is configured by a longitudinal wall 106a formed longitudinally longer, a front wall 106b and a rear wall 106c extended before and back from an upper half of the longitudinal wall 106a and an upper wall 106d provided on the upsides of the longitudinal wall 106a, the front wall 106b and the rear wall 106c.

In the longitudinal wall 106a, an inserting/fitting piece 106f inserted and fitted into a fitting hole (not shown) provided to the side of the front head cover 91 (see FIG. 4) is formed on the back of a lower part, and in the front wall 106b and the rear wall 106c, inserting/fitting pieces 106g, 106g inserted and fitted into fitting holes (not shown) provided to the side of the front head cover 91 are formed on the backs of respective lower parts.

FIG. 5(b) shows the back of the left cover 106 viewed from a direction shown by an arrow b in FIG. 5(a). Upper protruded parts 106j, 106j (only the reference numeral 106j on this side is shown) to which the central cover 108 (see FIG. 3) is attached are formed in its upper part.

FIG. 5(c) shows the bottom of the left cover 106 viewed from a direction shown by an arrow c in FIG. 5(a). A bolt insertion bole 106k for inserting a bolt inserted from the side of the central cover 108 (see FIG. 3) is respectively bored in the upper protruded parts 106j, 106j.

Figure 6A:
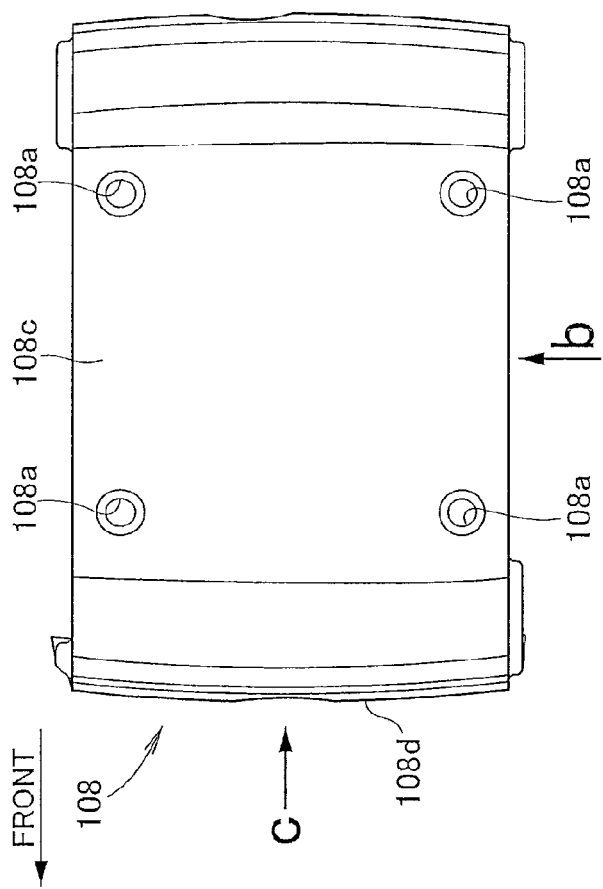
FIGS. 6(a), 6(b) and 6(c) are second explanatory drawings showing the front overhead cover according to the present invention.
Figure 6B:
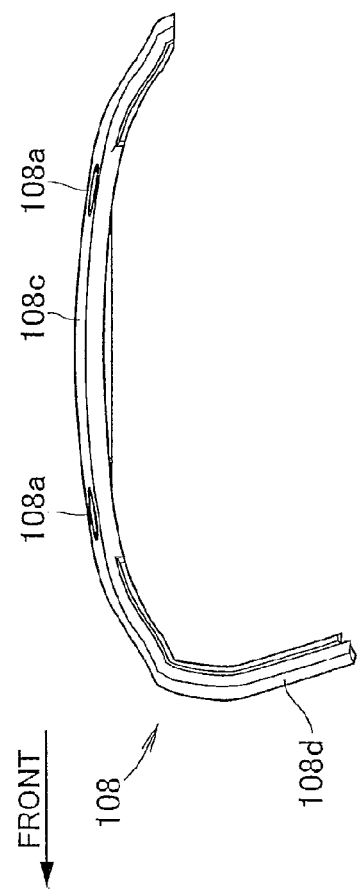
Figure 6C:
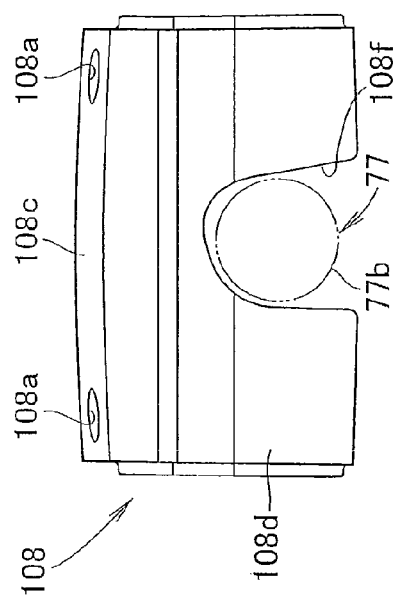

FIGS. 6(a) to 6(c) are second explanatory drawings showing the front overhead cover according to the invention and the central cover 108 will be described below.

FIG. 6(a) is a plan showing the central cover 108. The central cover 108 is in the shape of a rectangle longitudinally longer and four bolt insertion holes 108a into each of which a bolt to be inserted into each bolt insertion hole 106k (see FIG. 5(c)) of the left cover 106 (see FIGS. 5(a) to 5(c)) is inserted are bored.

FIG. 6(b) shows the central cover viewed from a direction shown by an arrow b in FIG. 6(a). The central cover 108 is configured by an upper wall 108c which is curved convexly upward and a top face of which is formed to be a smooth face and a front wall 108d which is bent downward from a front end of the upper wall 108c with the front wall integrated with the upper wall and the front of which is formed to be a smooth surface, and the bolt insertion holes 108a are provided to the upper wall 108c.

FIG. 6(c) shows the front wall viewed from a direction shown by an arrow c in FIG. 6(a) and in the front wall 108d, a cutout 108f for passing the first pipe 77b of the radiator upstream water passage 77 (see FIGS. 3 and 4) is formed.

As shown in FIGS. 3 and 6(b), as no rear wall extended downward is provided to the rear of the central cover 108, the radiator upstream water passage 77, the breather passage 93 and the secondary air pipe 96 can be easily extended backward between the rear of the central cover 108 and the front head cover 91.

As shown in FIGS. 1 to 4, in the saddle-ride vehicle 10 the engine 35 is provided with the front cylinder 54 extended forward and diagonally upward from the crankcase 51 and is mounted between the front wheel 38 and the rear wheel 41. The space 48 gradually vertically extended forward is provided between the fuel tank 27 arranged on the upside of the front cylinder 54. The front head cover 91 as a head cover is provided at the upper end of the front cylinder 54. The radiator upstream water passage 77 as a front water passage extended backward from the upper part of the radiator 47 is provided in front of the front cylinder 54 and is arranged in the space 48. The radiator upstream water passage 77 is covered with the front overhead cover 60 as an overhead cover attached to the front cylinder 54. Since the radiator upstream water passage 77 is covered with the front overhead cover 60, it is out of sight even in the American type of motorcycle having the large space 48 between the fuel tank 27 and the front head cover 91. Therefore, the appearance quality of the saddle-ride vehicle 10 can be enhanced, effectively protecting the radiator upstream water passage 77.

As shown in FIGS. 3 and 6(a) to 6(c), the front overhead cover 60 is formed by the left cover 106 and the right cover 107 that respectively cover the left and the right of the upper part of the front head cover 91. The central cover 108 covers a top face of the front head cover 91 between the left cover 106 and the right cover 107, and an outside face of the central cover 108 is formed to be a smooth face. The front overhead cover 60 has a structure divided into the left cover 106, the right cover 107 and the central cover 108. Therefore, the assembly workability can be enhanced. In addition, since the top face of the central cover 108 is formed to be a smooth face, the appearance quality of the engine 35 can be enhanced.

As shown in FIGS. 2 and 4, the engine 35 is provided with the rear cylinder 55 extended backward and diagonally upward from the crankcase 51. The upper water passage 73 as a central water passage that couples the front water jacket 71 and the rear water jacket 72 respectively as a water jacket is provided to the front cylinder 54 and the rear cylinder 55 is formed between the front cylinder 54 and the rear cylinder 55.

The thermostat 111 is arranged in the upper water passage 73. Therefore, the relatively large thermostat case 76 that houses the thermostat 111 can be effectively arranged utilizing a space between the front cylinder 54 and the rear cylinder 55, and a degree of freedom of arranging another body space can be enhanced.

As shown in FIGS. 6(a) to 6(c), as the cutout 108f as an opening for passing the radiator upstream water passage 77 is formed in the front of the central cover 108, the inside of the central cover 108 is hardly exposed and the appearance quality can be enhanced. As the cutout 108f is provided to the divided central cover 108, the machining of the cutout 108f can be facilitated.

As shown in FIGS. 3 and 4, as respective one ends of the breather pipe 102 for taking outside air so as to ventilate the inside of the engine 35 and/or the secondary air pipe 96 as a secondary air passage for taking secondary air in the exhaust passage are connected to the front head cover 91, the respective other ends are extended at the back of the front cylinder 54 and the breather pipe 102 and/or the secondary air pipe 96 are covered with the front overhead cover 60 in addition to the radiator upstream water passage 77, the appearance quality of the engine 35 and further, the motorcycle 10 (see FIG. 1) can be further enhanced.

The present invention is suitable for a saddle-ride vehicle in which a V-type engine is mounted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle-ride vehicle in which an engine provided with a front cylinder extended forward and diagonally upward from a crankcase is mounted between a front wheel and a rear wheel, comprising:
    a fuel tank arranged above the front cylinder and a head cover provided at an upper end of the front cylinder;
    a space above the front cylinder and the head cover and below the fuel tank; and
    a front water passage extended backward from an upper part of a radiator provided in front of the front cylinder is arranged in the space above the front cylinder in a manner such that all portions of the fuel tank are disposed above the front water passage,
    the front water passage being covered with an overhead cover attached to the front cylinder.

2. The saddle-ride vehicle according to claim 1,
    wherein the overhead cover is formed by a left cover and a right cover that respectively cover left and right of an upper part of the head cover, and a central cover that covers a top face of the head cover between the left cover and the right cover; and
    an outside face of the central cover is formed to include a smooth face.

3. The saddle-ride vehicle according to claim 1,
    wherein the engine is provided with a rear cylinder extended backward and diagonally upward from the crankcase;
    a central water passage that couples water jackets respectively provided to the front cylinder and the rear cylinder is formed between the front cylinder and the rear cylinder; and
    a thermostat is arranged in the central water passage.

4. The saddle-ride vehicle according to claim 1,
    the vehicle further comprising:
    a rear cylinder extended backward and diagonally upward from the crankcase; and
    a main frame extending backward and diagonally downward from a head pipe of the vehicle, the fuel tank being mounted on the main frame in a manner such that a vertical distance separating the overhead cover attached to the front cylinder and the fuel tank is larger that a vertical distance separating an overhead cover attached to the rear cylinder and the fuel tank.

5. The saddle-ride vehicle according to claim 2,
    wherein an opening for passing the front water passage is formed in a front portion of the central cover.

6. The saddle-ride vehicle according to claim 3,
    wherein an opening for passing the front water passage is formed in a front portion of the central cover.

7. The saddle-ride vehicle according to claim 4,
    wherein an opening for passing the front water passage is formed in a front portion of the central cover.

8. The saddle-ride vehicle according to claim 1,
    wherein one of a breather pipe for taking outside air so as to ventilate the inside of the engine and a secondary air passage for taking secondary air in an exhaust passage has one end connected to the head cover;
    wherein one of the breather pipe and the secondary air passage has an opposite end extended at a back of the front cylinder; and
    one of the breather pipe and the secondary air passage is covered by the overhead cover.

9. The saddle-ride vehicle according to claim 1,
    wherein each of a breather pipe for taking outside air so as to ventilate the inside of the engine and a secondary air passage for taking secondary air in an exhaust passage has one end connected to the head cover;
    wherein each of the breather pipe and the secondary air passage has an opposite end extended at a back of the front cylinder; and
    each of the breather pipe and the secondary air passage is covered by the overhead cover.

10. The saddle-ride vehicle according to claim 2,
    wherein each of a breather pipe for taking outside air so as to ventilate the inside of the engine and a secondary air passage for taking secondary air in an exhaust passage has one end connected to the head cover;
    wherein each of the breather pipe and the secondary air passage has an opposite end extended at a back of the front cylinder; and
    each of the breather pipe and the secondary air passage is covered by the overhead cover.

11. A saddle-ride vehicle in which an engine provided with a front cylinder extended forward and diagonally upward from a crankcase is mounted between a front wheel and a rear wheel, comprising:
    a fuel tank arranged above the front cylinder and a head cover provided at an upper end of the front cylinder;
    a space above the front cylinder and the head cover and below the fuel tank; and
    a front water passage extended backward from an upper part of a radiator provided in front of the front cylinder is arranged in the space above the front cylinder in a manner such that all portions of the fuel tank are disposed above the front water passage,
    an overhead cover attached to the front cylinder,
    the vehicle further comprising:
    a rear cylinder extended backward and diagonally upward from the crankcase; and
    a main frame extending backward and diagonally downward from a head pipe of the vehicle, the fuel tank being mounted on the main frame in a manner such that a vertical distance separating the overhead cover attached to the front cylinder and the fuel tank is larger that a vertical distance separating an overhead cover attached to the rear cylinder and the fuel tank, wherein the overhead cover is formed by a left cover and a right cover that respectively cover left and right of an upper part of the head cover, and a central cover that covers a top face of the head cover between the left cover and the right cover; and an outside face of the central cover is formed to include a smooth face.

12. The saddle-ride vehicle according to claim 11, wherein the engine is provided with a rear cylinder extended backward and diagonally upward from the crankcase;

a central water passage that couples water jackets respectively provided to the front cylinder and the rear cylinder is formed between the front cylinder and the rear cylinder; and a thermostat is arranged in the central water passage.

13. The saddle-ride vehicle according to claim 11, wherein an opening for passing the front water passage is formed in a front portion of the central cover covers the top face of the head cover between the left cover and the right cover.

14. The saddle-ride vehicle according to claim 12, wherein an opening for passing the front water passage is formed in a front portion of the central cover covers the top face of the head cover between the left cover and the right cover.

15. The saddle-ride vehicle according to claim 11, wherein one of a breather pipe for taking outside air so as to ventilate the inside of the engine and a secondary air passage for taking secondary air in an exhaust passage has one end connected to the head cover;

wherein one of the breather pipe and the secondary air passage has an opposite end extended at a back of the front cylinder; and one of the breather pipe and the secondary air passage is covered by the overhead cover.

16. The saddle-ride vehicle according to claim 11, wherein each of a breather pipe for taking outside air so as to ventilate the inside of the engine and a secondary air passage for taking secondary air in an exhaust passage has one end connected to the head cover;

wherein each of the breather pipe and the secondary air passage has an opposite end extended at a back of the front cylinder; and each of the breather pipe and the secondary air passage is covered by the overhead cover.

* * * * *